(12) United States Patent
Bouzaraa et al.

(10) Patent No.: US 11,055,827 B2
(45) Date of Patent: Jul. 6, 2021

(54) IMAGE PROCESSING APPARATUS AND METHOD

(71) Applicant: Huawei Technologies Co., Ltd., Shenzhen (CN)

(72) Inventors: Fahd Bouzaraa, Munich (DE); Onay Urfalioglu, Munich (DE); Ibrahim Halfaoui, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 10 days.

(21) Appl. No.: 16/729,039

(22) Filed: Dec. 27, 2019

(65) Prior Publication Data

US 2020/0134787 A1 Apr. 30, 2020

Related U.S. Application Data

(63) Continuation of application No. PCT/EP2017/066017, filed on Jun. 28, 2017.

(51) Int. Cl.
*G06T 5/00* (2006.01)
*G06T 5/50* (2006.01)

(52) U.S. Cl.
CPC .............. *G06T 5/003* (2013.01); *G06T 5/007* (2013.01); *G06T 5/50* (2013.01);
(Continued)

(58) Field of Classification Search
CPC .............. G06T 5/50; G06T 2207/20208; G06T 2207/20081; G06T 2207/20221;
(Continued)

(56) References Cited

U.S. PATENT DOCUMENTS

2010/0246940 A1 9/2010 Lin
2018/0241929 A1* 8/2018 Bouzaraa ........... H04N 5/23277
(Continued)

OTHER PUBLICATIONS

Sheth, "Deep Neural Networks for HDR imaging Contents," XP055400094, pp. 1-8, Indian Institute of Technology Gandhinagar, Gandhinagar, India (Nov. 3, 2016).
(Continued)

*Primary Examiner* — Jingge Wu
(74) *Attorney, Agent, or Firm* — Leydig, Voit & Mayer, Ltd.

(57) ABSTRACT

The invention relates to an image processing apparatus for generating an HDR image associated with a first view on the basis of a plurality of LDR images, including a first LDR image and a second LDR image. The first LDR image is associated with the first view and a first exposure, i.e. a first dynamic range, and the second LDR image is associated with a second view and a second exposure, i.e. a second dynamic range. The image processing apparatus comprises a processor configured to provide a neural network having a plurality of neural subnetworks including a first neural subnetwork. The first neural subnetwork is configured to generate the HDR image on the basis of: (i) the first LDR image, (ii) the second LDR image, and (iii) a modified first LDR image. The modified first LDR image is associated with the first view and the second exposure.

15 Claims, 5 Drawing Sheets

500

501
Providing a neural network comprising a plurality of neural subnetworks including a first neural subnetwork 503
Generating by the first neural subnetwork an HDR image on the basis of: (i) a first LDR image associated with a first view and a first exposure, (ii) a second LDR image associated with a second view and a second exposure, and (iii) a modified first LDR image, wherein the modified first LDR image is associated with the first view and the second exposure

(52) U.S. Cl.
CPC ............... *G06T 2207/20084* (2013.01); *G06T 2207/20208* (2013.01); *G06T 2207/20221* (2013.01)

(58) Field of Classification Search
CPC ......... G06T 5/007; G06T 1/0007; G06T 7/55; G06N 3/0454; G06N 3/08; G06N 3/084; H04N 5/2355
See application file for complete search history.

(56) References Cited

U.S. PATENT DOCUMENTS

| | | | | |
|---|---|---|---|---|
| 2018/0359416 | A1* | 12/2018 | Hold-Geoffroy | G06T 15/506 |
| 2019/0096046 | A1* | 3/2019 | Kalantari | G06T 5/009 |
| 2019/0164261 | A1* | 5/2019 | Sunkavalli | G06T 1/0007 |
| 2019/0228510 | A1* | 7/2019 | Hwang | H04N 9/77 |
| 2020/0007738 | A1* | 1/2020 | Chu | H04N 5/232 |
| 2020/0151498 | A1* | 5/2020 | Sun | G06K 9/4628 |
| 2020/0394772 | A1* | 12/2020 | Afra | G06F 9/3877 |

OTHER PUBLICATIONS

Bouzaraa et al., "CNN Based Non-Local Color Mapping," 2016 IEEE International Symposium on Multimedia (ISM), XP033048248, pp. 313-316, Institute of Electrical and Electronics Engineers, New York, New York (2016).

Kang et al., "High dynamic range video," pp. 319-325, Interactive Visual Media Group, Microsoft Research, Redmond, WA (2003).

Sen et al., "Robust Patch-Based HDR Reconstruction of Dynamic Scenes," ACM Transactions on Graphics, vol. 31, No. 6, pp. 1-11, Association for Computing Machinery, New York, New York (Nov. 2012).

Barnes et al., "The Generalized PatchMatch Correspondence Algorithm," ECCV 2010, Part III, LNCS 6313, pp. 29-43, Springer-Verlag Berlin Heidelberg, New York, New York (2010).

Hu et al., "HDR Deghosting: How to Deal with Saturation?," IEEE Conference on Computer Vision and Pattern Recognition, pp. 1163-1170, Institute of Electrical and Electronics Engineers, New York, New York (2013).

Mertens et al., "Exposure Fusion," 15th Pacific Conference on Computer Graphics and Applications (PG '07), pp. 382-390, Institute of Electrical and Electronics Engineers, New York, New York (2007).

Khan et al., "Ghost Removal in High Dynamic Range Images," IEEE International Conference on Images Processing, pp. 2005-2008, Institute of Electrical and Electronics Engineers, New York, New York (2006).

Gallo et al., "Artifact-free High Dynamic Range Imaging," IEEE International Conference on Computational Photography, pp. 1-7, Institute of Electrical and Electronics Engineers, New York, New York (2009).

An et al., "A Multi-Exposure Image Fusion Algorithm Without Ghost Effect," IEEE International Conference on Acoustics, Speech and Signal Processing, pp. 1565-1568, Institute of Electrical and Electronics Engineers, New York, New York (2011).

Pece et al., "Bitmap Movement Detection: HDR for Dynamic Scenes," Conference on Visual Media Production, pp. 1-8, Institute of Electrical and Electronics Engineers, New York, New York (2010).

An et al., "Probabilistic Motion Pixel Detection for the Reduction of Ghost Artifacts in High Dynamic Range Images from Multiple Exposures," EURASIP Journal on Image and Video Processing, pp. 1-15, European Association for Signal Processing (2014).

Zimmer et al,. "Freehand HDR Imaging of Moving Scenes with Simultaneous Resolution Enhancement," Computer Graphics Forum, vol. 30, No. 2, pp. 1-10, Eurographics, Blackwell Publishing, Oxford, UK (2011).

Mertens et al,. "Exposure Fusion: A simple and practical alternative to high dynamic range photography," Computer Graphics Forum, vol. 28, No. 1, pp. 161-171, Eurographics, Blackwell Publishing, Oxford, UK (2009).

* cited by examiner

IMAGE PROCESSING APPARATUS AND METHOD

CROSS-REFERENCE TO RELATED APPLICATIONS

This application is a continuation of International Application No. PCT/EP2017/066017, filed on Jun. 28, 2017, the disclosure of which is hereby incorporated by reference in its entirety.

TECHNICAL FIELD

The invention relates to the field of image processing. More specifically, the invention relates to an image processing apparatus and a method for generating a high dynamic range (HDR) image on the basis of a plurality of low dynamic range (LDR) images using machine learning or deep learning based on neural networks.

BACKGROUND

A common approach to create a high dynamic range (HDR) image of a scene is to combine several low dynamic range (LDR) images captured under different illumination (exposure) settings, thus ranging from under-exposure (dark) to over-exposure (bright). This technique, known as exposure bracketing, is based on the assumption that the input LDR images are aligned. However, this assumption rarely holds, as the input images are captured sequentially in time. Misalignment due to camera- or scene-related motion results in visible artefacts in the final HDR image, where several instances of the same object can be seen. These artefacts are known as "ghost effect".

Rendering an artefact-free HDR image of dynamic scenes has been thoroughly investigated by the computer vision community. Several approaches claim to successfully handle the misalignment and the associated inconsistencies, so that the final HDR is ghost- and blur-free. Generally, these methods fall into two major categories:

The first category falls under the scope of the de-ghosting methods. The idea behind these approaches is to detect inconsistencies belonging to dynamic pixels, compared to a reference LDR image selected from of the input stack. These methods usually assume that the camera is static or rather propose a global registration step to compensate for the misalignment. In the case of camera motion (translation and rotation), the background of the depicted scene in the reference and non-reference images will be different. In order to align the reference and non-reference images, a low-complexity global motion registration step can be proposed. In general this step is based on the computation of a "Homography" matrix H using matched features points between the reference and non-reference images. To this end, speeded up robust features (SURF)/scale-invariant feature transform (SIFT) or similar approaches can be used to detect and extract feature points between the pair of reference and non-reference images. Several approaches for features matching can be used, such as random sample consensus (RANSAC). Based on this Homography matrix, the non-reference image is warped back to the view of the reference image. This step makes the detection of object motion easier.

In general, the merging procedure excludes dynamic regions and inconsistencies from the final HDR image. A schematic graphical representation summarizing the most relevant steps of a conventional de-ghosting approach 100 is shown in FIG. 1.

De-ghosting approaches are the methods of choice in scenarios where the computational cost of the enabling algorithm needs to be low. Nonetheless, scenes with large exposure and scene differences may be challenging for these methods. Motion related artefacts can still be seen in case of non-rigid motion or large perspective differences in comparison to the reference LDR image.

The second category comprises approaches relying on correspondences (sparse or dense) in order to align the images. In this context, alignment can be either spatial where the non-reference LDR images are warped to the view of the selected reference image, or color-related by aligning the reference LDR image to each non-reference LDR image separately in terms of colors (color mapping). In both cases, the goal is to reproduce a stack of aligned but differently exposed LDR images corresponding to the reference view.

S. B. Kang, M. Uyttendaele, S. Winder, and R. Szeliski. "High dynamic range video", in ACM Transactions on Graphics (TOG), volume 22, pages 319-325, 2003, introduces an approach which uses optical flow in order to align the input differently exposed images, in the context of video HDRI. P. Sen, N. Khademi Kalantari, M. Yaesoubi, S. Darabi, D. Goldman, and E. Shechtman, "Robust Patch-Based HDR Reconstruction of Dynamic Scenes", ACM Transactions on Graphics (Proceedings of SIGGRAPH Asia 2012), 31(6):1-11, 2012, discloses a solution for simultaneous HDR image reconstruction and alignment of the input images using a joint patch-based minimization framework. The alignment is based on a modified version of the Patch-Match (PM) algorithm disclosed in C. Barnes, E. Shechtman, D. B. Goldman, and A. Finkelstein, "The Generalized PatchMatch Correspondence Algorithm", in 11th European Conference on Computer Vision ECCV, pages 29-43, 2010. Likewise, J. Hu, O. Gallo, K. Pulli, and X. Sun, "HDR Deghosting: How to Deal with Saturation?", in IEEE Conference on Computer Vision and Pattern Recognition, pages 1163-1170, 2013, proposes aligning every non-reference LDR image to the selected reference image, which typically has the highest number of well-exposed pixels.

A schematic graphical representation summarizing the most relevant steps in the context of a conventional alignment-based approach 200 is provided in FIG. 2:

Considering both categories described above and summarized in FIGS. 1 and 2, the HDR rendering stage of the existing HDR imaging (HDRI) approaches for dynamic scenes takes as input either the reference LDR image and the non-reference LDR (de-ghosting approaches, FIG. 2) or the input reference LDR and the color mapping results (or the output of similar stages). Consequently, both categories of existing HDRI approaches only make use of a part of the information that is actually available for rendering an HDR image. For example, if an instance of the reference LDR with the corresponding exposure time equal to the exposure time of a non-reference LDR is available, there exists no approach that includes the non-reference LDR during the HDR rendering stage.

Thus, there is a need for an improved data processing apparatus and method.

SUMMARY

The present disclosure describes an improved data processing apparatus and method.

Generally, embodiments described herein provide a new approach for generating an HDR image from an input stack of LDR images with scene (i.e. view) and/or color differences due to different exposure setting of the capturing device. Embodiments provide all possible combinations of input LDR images as an input to an HDR merging stage. This includes the original input reference and non-reference LDR images, as well as all estimated instances of the reference LDR (for example having the exposure times of the non-reference image). Embodiments are based on convolutional neural networks (CNNs), which provide a convenient framework for processing several input images simultaneously and in a way that takes into account all possible information provided by these images. Embodiments decompose the HDR rendering process into several sub-processes, namely color mapping, HDR merging and HDR guided de-ghosting. Each sub-process is represented through a CNN sub-network. During the training stage, each sub-network learns the parameters of the function related to the task assigned to it. All sub-networks are connected together to form an end-to-end mapping between the input LDR images and the corresponding HDR image of the reference.

In order to describe the invention in detail, the following terms, abbreviations and notations will be used:

Image—a visual representation of a real world or synthetic scene by a digital camera; also referred to as picture.

Pixel—the smallest addressable picture/image element.

Color mapping—(also known as color calibration or color matching) is the operation of mapping the colors of an image (source image) to the colors of another image (reference image).

Image Histogram—Graphical illustration of the distribution of the pixel color intensities of an image.

Reference Image—LDR image which belongs to the input stack of images. The final HDR image is a modified version of the reference image which has a wider dynamic range.

Non-Reference Image—LDR image which belongs to the input stack of images. The non-reference image is different from the reference image in terms of scene content and/or color properties.

Exposure—Describes the amount of light gathered by the capturing device (camera . . . ). A low-exposed image appears to be dark and a high-exposed image appears to be bright.

Dynamic Pixel—Image pixel which depicts a different part of the captured scene, in comparison to pixel with the same pixel coordinates inside the reference image. Dynamic pixels typically belong to motion objects.

Motion Pixel—Dynamic pixel.

Ghost-effect—Type of image noise (artefact) in an HDR image which results from merging several non-aligned input LDR images (non-aligned due to camera or scene motion). Motion-related objects are depicted multiple times in the HDR, which create the ghost effect.

Target Image—Image whose color distribution (or histogram) will be used as a reference during a color mapping operation. The target image usually contains semantic differences in comparison to the source image.

Ground Truth Image—image containing target color properties such as a wider dynamic range or different exposure properties, but depicts the same scene content as the related reference image.

Machine Learning—Field of research which focuses on analysing and learning from input data for the purpose of building a model capable of making predictions.

Artificial Neural Network—Is a machine learning subfield in the context of deep learning, motivated by biological neural networks. Artificial networks aim at estimating functions with large number of inputs, by adaptively learning a set of connection weights.

Convolution—Mathematical operation which computes the amount of overlap of 2 functions, one of them being reversed and shifted, using integral computation.

Convolutional Neural Network—is an artificial neural network which contains at least one convolutional layer in its architecture.

Feature Map—Captures the high level data abstractions or features in each layer of the convolutional network. A feature map is obtained by convolving a filter on sub-regions of the whole image.

According to a first aspect, the invention relates to an image processing apparatus for generating an HDR image associated with a first view on the basis of a plurality of LDR images, including a first LDR image (which can be a reference image) and a second LDR image, wherein the first LDR image is associated with the first view and a first exposure and the second LDR image is associated with a second view and a second exposure. The image processing apparatus comprises a processing unit configured to provide a neural network, wherein the neural network comprises a plurality of neural subnetworks including a first neural subnetwork, wherein the first neural subnetwork is configured to generate the HDR image on the basis of: (i) the first LDR image, (ii) the second LDR image, and (iii) a modified version of the first LDR image, wherein the modified first LDR image is associated with the first view and the second exposure.

Thus, an improved image processing apparatus is provided. In comparison to the prior art the improved image processing apparatus takes into account more possible combinations of input LDR images for rendering the HDR image and, thus, improves the quality of the HDR image.

In a further implementation form of the first aspect, the plurality of neural subnetworks comprises a second neural subnetwork, which is configured to generate the modified version of the first LDR image on the basis of (i) the first LDR image and (ii) the second LDR image by mapping, i.e. color mapping, the first LDR image to the second exposure.

As already defined above, color mapping is the operation of mapping the colors of an image (source image) to the colors of another image (reference image).

In a further implementation form of the first aspect, the plurality of LDR images further comprises a third LDR image, which is associated with a third view and a third exposure, and wherein the second neural subnetwork comprises a first portion and a second portion, wherein the first portion of the second neural subnetwork is configured to generate the modified version of the first LDR image on the basis of (i) the first LDR image and (ii) the second LDR image by mapping the first LDR image to the second exposure and wherein the second portion of the second neural subnetwork is configured to generate a further modified version of the first LDR image, wherein the further modified first LDR image is associated with the first view and the second exposure, on the basis of (i) the first LDR image and (ii) the third LDR image by mapping the first LDR image to the third exposure.

In a further implementation form of the first aspect, the plurality of neural subnetworks comprises a third neural subnetwork configured to provide an improved version of the HDR image by removing ghosting artefacts from the HDR image on the basis of: (i) the first LDR image, (ii) the second LDR image, (iii) the modified version of the first LDR image, (iv) the HDR image being associated with the first view, and (v) a de-ghosting guiding HDR image.

In a further implementation form of the first aspect, the processing unit is further configured to provide an exposure fusion unit configured to generate the de-ghosting guiding HDR image on the basis of an exposure fusion scheme based on (i) the first LDR image and (ii) the second LDR image.

In a further implementation form of the first aspect, the exposure fusion unit is configured to generate the de-ghosting guiding HDR image on the basis of the exposure fusion scheme by performing a weighted blending of (i) the first LDR image and (ii) the second LDR image using a weight map based on one or more quality measures.

In a further implementation form of the first aspect, each of the plurality of neural subnetworks comprises one or more convolutional layers and one or more de-convolutional layers.

In a further implementation form of the first aspect, the neural network is configured to be trained on the basis of a plurality of training sets, wherein each training set comprises an HDR image associated with a respective first view and a plurality of LDR images and wherein at least some training sets comprise more than two LDR images.

In a further implementation form of the first aspect, the first neural subnetwork further comprises a weighting layer configured to generate a weighting map based on one or more quality measures for reducing the effects of low quality regions of the first LDR image and the second LDR image in generating the HDR image. The weighting map represents a quality assessment of the corresponding LDR image according to a specific quality measure such as contrast and/or well-exposedness and/or saturation, and various other measures.

In a further implementation form of the first aspect, the processing unit is further configured to select the first LDR image from the plurality of LDR images as a reference image on the basis of a quality measure for reference image selection.

In a further implementation form of the first aspect, the image processing apparatus further comprises an image capturing unit, for instance, a camera, configured to capture the first LDR image and the second LDR image.

In a further implementation form of the first aspect, the image processing apparatus further comprises a display configured to display the final HDR image.

In a further implementation form of the first aspect, the image processing apparatus is a smartphone.

According to a second aspect the invention relates to a corresponding image processing method for generating an HDR image associated with a first view on the basis of a plurality of LDR images, including a first LDR image and a second LDR image, wherein the first LDR image is associated with a first view and a first exposure and the second LDR image is associated with a second view and a second exposure, wherein the image processing method comprises the steps: providing a neural network, wherein the neural network comprises a plurality of neural subnetworks including a first neural subnetwork; and generating by the first neural subnetwork the HDR image on the basis of: (i) the first LDR image, (ii) the second LDR image, and (iii) a modified version of the first LDR image, wherein the modified first LDR image is associated with the first view and the second exposure.

The image processing method according to the second aspect of the invention can be performed by the image processing apparatus according to the first aspect of the invention. Further features of the image processing method according to the second aspect of the invention result directly from the functionality of the image processing apparatus according to the first aspect of the invention and its different implementation forms.

According to a third aspect the invention relates to a computer program comprising program code for performing the method according to the second aspect, when executed on a processor or a computer.

The invention can be implemented in hardware and/or software.

BRIEF DESCRIPTION OF THE DRAWINGS

Further embodiments of the invention will be described with respect to the following figures, wherein.

In the various figures, identical reference signs will be used for identical or at least functionally equivalent features.

DETAILED DESCRIPTION OF THE EMBODIMENTS

In the following description, reference is made to the accompanying drawings, which form part of the disclosure, and in which are shown, by way of illustration, specific aspects in which the present invention may be placed. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
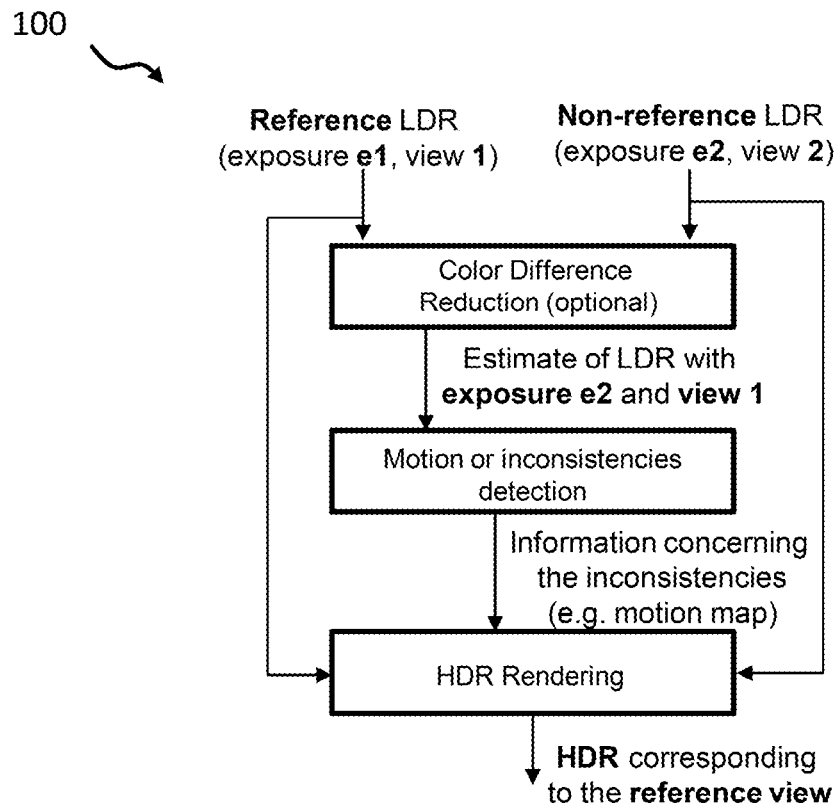
FIG. 1 shows a schematic diagram illustrating a conventional de-ghosting approach for rendering an HDR image.
Figure 2:
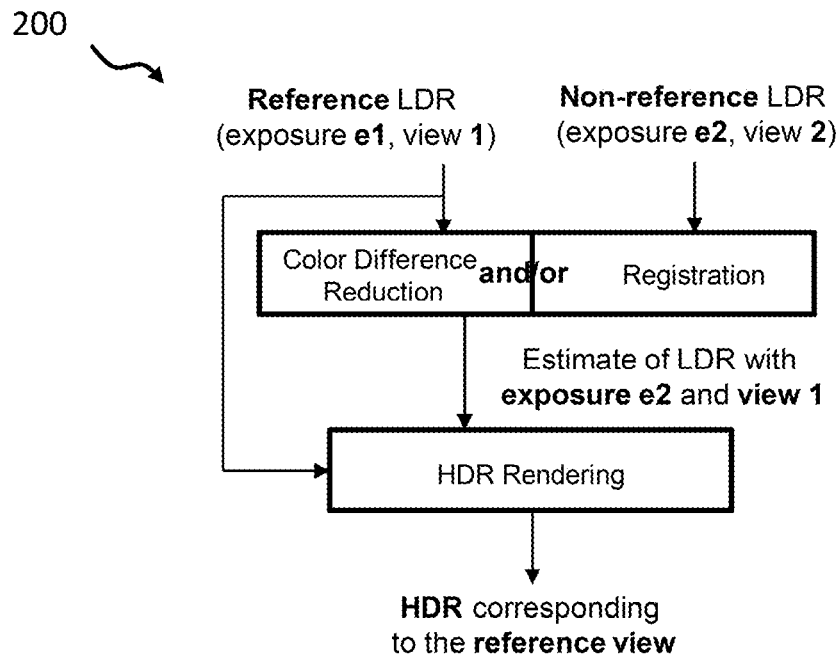
FIG. 2 shows a schematic diagram illustrating a conventional alignment-based approach for rendering an HDR image.
Figure 3:
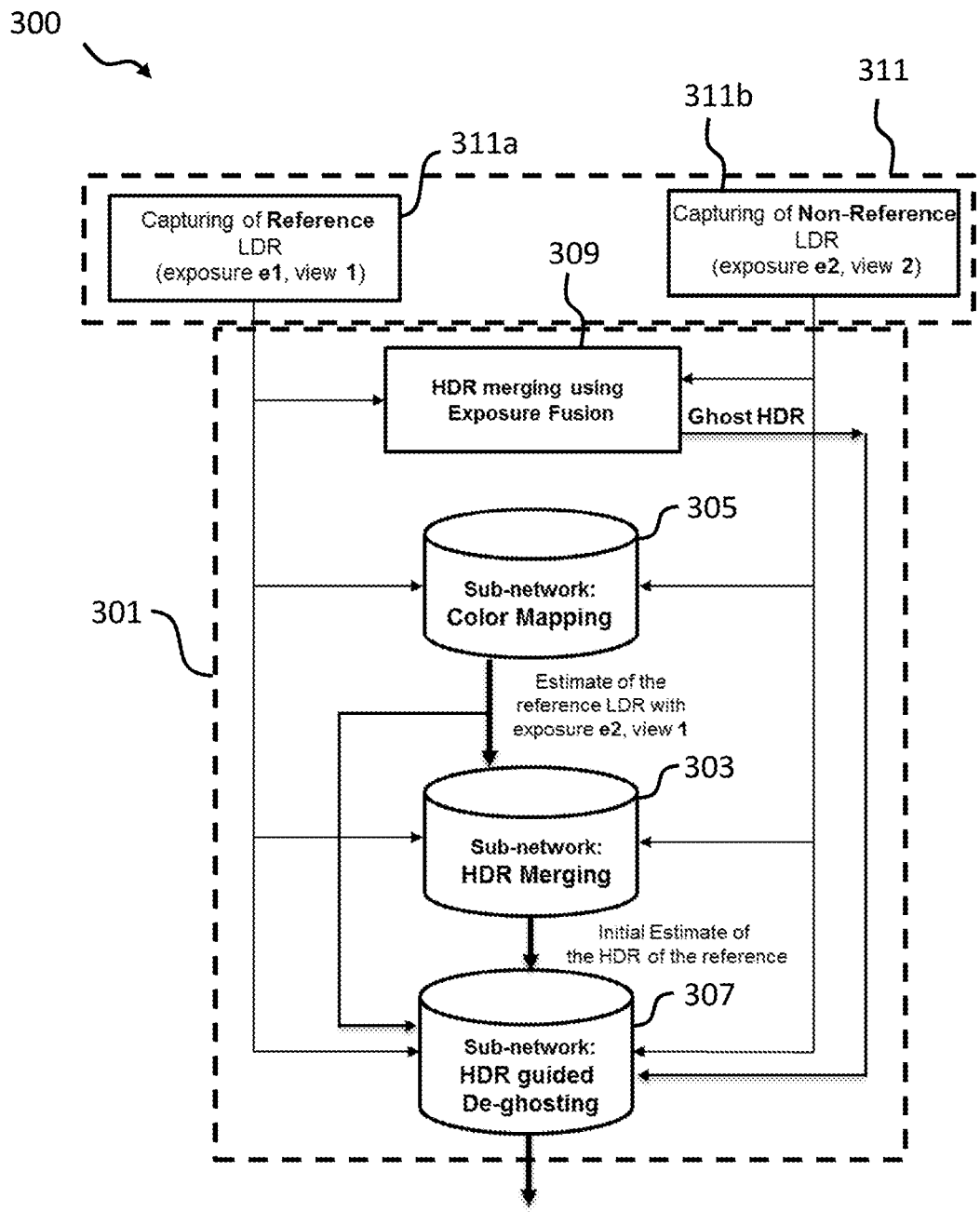
FIG. 3 shows a schematic diagram illustrating an image processing apparatus for rendering an HDR image according to an embodiment.

FIG. 3 shows a schematic diagram illustrating an image processing apparatus 300 according to an embodiment for generating a high dynamic range (HDR) image on the basis of a plurality of low dynamic range (LDR) images. The image processing apparatus 300 can be, for instance, a smartphone or another electronic device with a display for displaying the HDR image. The plurality of LDR images include a first LDR image associated with a first view and a first exposure and a second LDR image associated with a second view and a second exposure. By way of example, the first LDR image can be chosen as the reference image, meaning that also the final HDR image will be associated with the same view as the first LDR image, i.e. the first view. By way of example, the first LDR reference image can be an under-exposed dark LDR image, whereas the second LDR reference image is an over-exposed bright LDR image. Generally, embodiments can be applied to any exposure ratios between the input LDR images.

The image processing apparatus 300 comprises a processing unit 301 configured to provide a neural network, wherein the neural network comprises a plurality of neural subnetworks including a first neural subnetwork 303, which is referred to as "HDR Merging" in FIG. 3. As will be described in more detail further below, the first neural subnetwork 303 is configured to generate the HDR image on the basis of: (i) the first LDR image, i.e. the reference image, (ii) the second LDR image, and (iii) a modified version of the first LDR image, wherein the modified first LDR image is associated with the first view and the second exposure. In the embodiment shown in FIG. 3, the first LDR reference image is provided by a first portion 311a of a capturing unit 311, for instance, a camera, and the second LDR image is provided by a second portion 311b of the capturing unit 311. The different view associated with the first LDR image and the second LDR image can be, for instance, due to a motion of the capturing unit 311 or due to the capturing unit 311 being implemented in the form of a stereo camera.

In the embodiment shown in FIG. 3, the plurality of neural subnetworks of the neural network provided by the processing unit 301 further comprises a second neural subnetwork 305 (referred to as "Color Mapping" in FIG. 3) which is configured to generate the modified version of the first LDR image on the basis of (i) the first LDR image, i.e. the reference image, and (ii) the second LDR image by color mapping the first LDR image to the second exposure. In this portion of the neural network provided by the processing unit 301 the second color mapping subnetwork 305 learns a color mapping model which enables the estimation of differently exposed instances of the reference LDR image. This means that during this stage, a second version of the reference LDR image with exposure e2 and view 1 is generated.

The plurality of neural subnetworks of the neural network provided by the processing unit 301 can further comprises a third neural subnetwork 307, which is referred to as "HDR guided de-ghosting" in FIG. 3 and configured to provide an improved version of the HDR image by removing ghosting artefacts from the HDR image provided by the first neural subnetwork 303 on the basis of: (i) the first LDR image, i.e. the reference image, (ii) the second LDR image, (iii) the modified version of the first LDR image, (iv) the HDR image provided by the first neural subnetwork 303, and (v) a de-ghosting guiding HDR image. The purpose of the third neural subnetwork 307 is to enhance the visual quality of the HDR image provided by the first neural subnetwork 303 (HDR merging), using prior information provided by the previously rendered ghost HDR image. This way, artefacts related to under- and/or over-exposure can be reduced in the final HDR image. In an embodiment, the model of the third neural subnetwork 307 and/or the other neural subnetworks 303, 305 can be trained using ground-truth HDR images composed from large stacks of LDRs.

In the embodiment shown in FIG. 3, the processing unit 301 further comprises an exposure fusion unit 309 configured to generate the de-ghosting guiding HDR image as input to the third neural subnetwork 307 on the basis of an exposure fusion scheme based on (i) the first LDR image, i.e. the reference image, and (ii) the second LDR image. The resulting image (referred to as "Ghost HDR" image in FIG. 3) contains the so-called "ghost artefacts" due to several instances of the same objects which appear at different locations caused by the difference in terms of content between the input LDRs. As already described above, the "Ghost-HDR" image can be used as an additional input to the last stage, namely the third guided-deghosting subnetwork 307.

In an embodiment, the exposure fusion unit 309 of the processing unit 301 is configured to generate the de-ghosting guiding HDR image on the basis of the exposure fusion scheme by performing a weighted blending of (i) the first LDR image, i.e. the reference image, and (ii) the second LDR image using a weight map based on one or more quality measures. More details about possible implementations of the exposure fusion unit 309 of the processing unit 301 can be found in T. Mertens, J. Kautz, and F. Van Reeth, "Exposure Fusion," in Pacific Graphics, 2007, pp. 369-378, which is fully incorporated by reference herein.

As already described above, the first neural subnetwork 303 (HDR merging) is configured to generate the HDR image on the basis of: (i) the first LDR image, i.e. the reference image, (ii) the second LDR image, and (iii) a modified version of the first LDR image provided by the second neural subnetwork 305 (Color Mapping). In an embodiment, these input images can be concatenated and presented to the first neural subnetwork 303 as a tensor having dimensions of width×height×9 (in the case of RGB inputs). The HDR merging subnetwork 303 is trained to produce an HDR image with a corresponding dynamic range larger than the range available in the input LDR images. In an embodiment, this is done by generating the corresponding ground-truth HDR image during the training phase using a higher number of LDR images. Accordingly, the trained HDR merging model is capable of generating a dynamic range larger than the ones available in the inputs. In this way, the trained model does not only render a ghost-free HDR image, but also simulates the case where more than 2 input LDR images are available. This allows dealing with challenging cases in terms of exposure differences and number of input images.

Each of the neural subnetworks 303, 305, 307 of the neural network provided by the processing unit 301 can comprise one or more convolutional layers and one or more de-convolutional layers.

In an embodiment, the first neural subnetwork 303 further comprises a weighting layer configured to generate a weighting map based on one or more quality measures for reducing the effects of low quality regions of the first LDR image and the second LDR image in generating the HDR image. Such a weighting map represents a quality assessment of the corresponding LDR image according to a specific quality measure such as contrast and/or well-exposedness and/or saturation, and/or various other measures. The generated weighting maps for each input LDR image enables the selective merging of the images into the final HDR image. For example, if the weighting maps are based on the well-exposedness measure, pixels in the input LDR images with values close to 127 (or 0.5) can get higher weights in an embodiment. In contrast, pixel values close to 0 or 255 which correspond respectively to under- and over-exposed areas, will get lower weights. Accordingly, the effect of these areas on the final HDR image can be limited according to embodiments. In an embodiment, these weighting maps can be implemented in the third neural subnetwork 307 as well.

In an embodiment, the processing unit 301 is further configured to select the first LDR image from the plurality of LDR images as a reference image on the basis of a quality measure for reference image selection. Such a quality measure for reference image selection can be similar or identical to the quality measures used in the exposure fusion unit 309 described above, such as saturation, well-exposedness and/or contrast.

Figure 4:
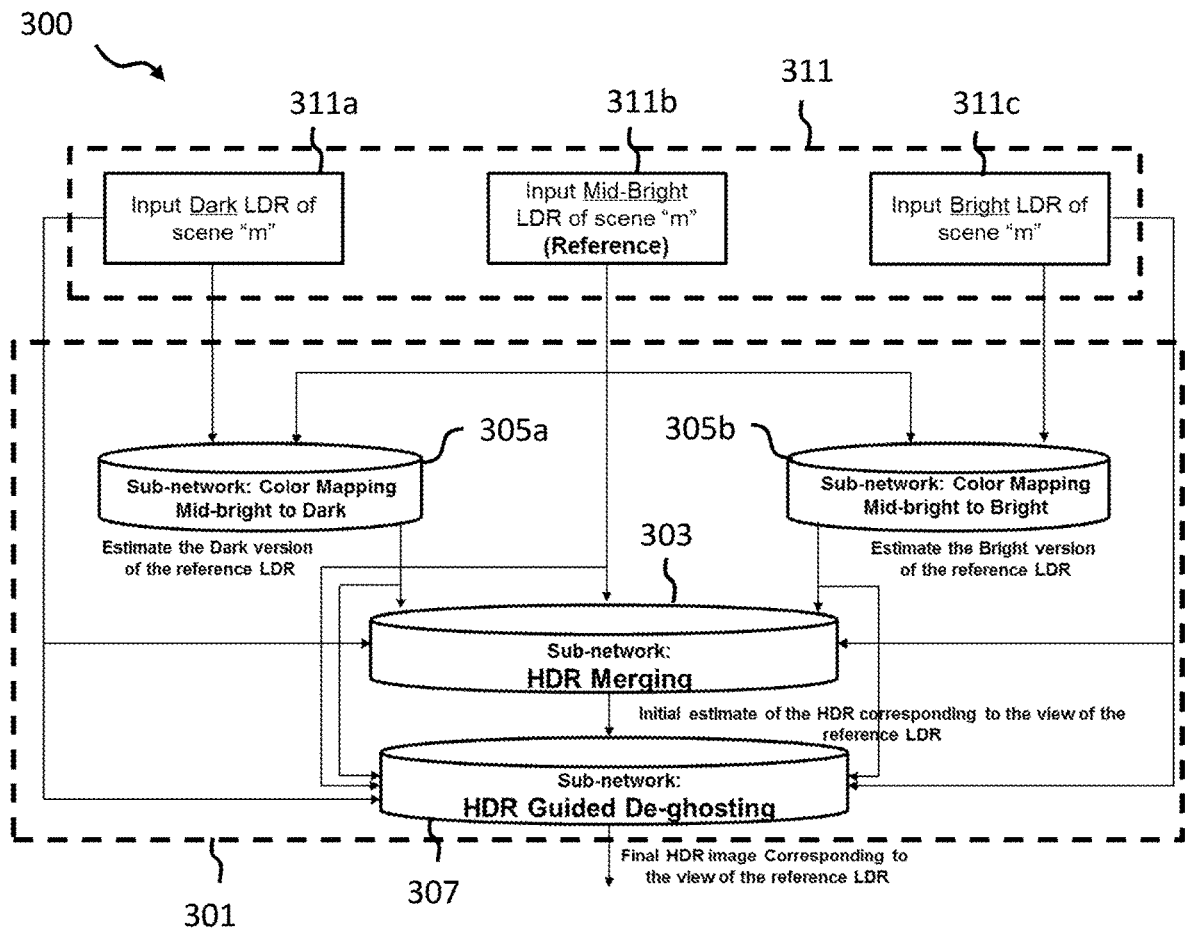
FIG. 4 shows a schematic diagram illustrating an image processing apparatus for rendering an HDR image according to an embodiment.

FIG. 4 shows a further embodiment of the image processing apparatus 300 for rendering an HDR image. In comparison to the processing unit 301 of the image processing apparatus 300 shown in FIG. 3, the processing unit 301 of the image processing apparatus 300 shown in FIG. 4 takes as input three LDR images associated with different views and/or exposures, for instance, a first "mid-bright" LDR reference image provided by a first portion 311b of the capturing unit 311, a second "dark" LDR image provided by a second portion 311a of the capturing unit 311 and a third "bright" LDR image provided by a third portion 311c of the capturing unit 311. Generally, the "mid-bright" LDR image should contain a larger set of scene details in comparison to the under-("dark") and over-exposed ("bright") images.

Consequently, in the embodiment shown in FIG. 4 the second neural subnetwork 305 comprises a first neural subnetwork portion 305a (referred to as "Color Mapping Mid-bright to Dark" in FIG. 4) and a second neural subnetwork portion 305b (referred to as "Color Mapping Mid-bright to Bright" in FIG. 4). The first portion 305a of the second neural subnetwork 305 is configured to generate the modified first LDR image on the basis of (i) the first LDR reference image and (ii) the second LDR image by color mapping the first LDR reference image to the second exposure. The second portion 305b of the second neural subnetwork 305 is configured to generate a further modified first LDR image, wherein the further modified first LDR image is associated with the first view and the second exposure, on the basis of (i) the first LDR reference image and (ii) the third LDR image by color mapping the first LDR reference image to the third exposure. As illustrated in the embodiment of FIG. 4, both the modified first LDR image provided by the first portion 305a and the further modified first LDR image provided by the second portion 305b are inputs for the first neural subnetwork 303 and the third neural subnetwork 307.

Figure 5:
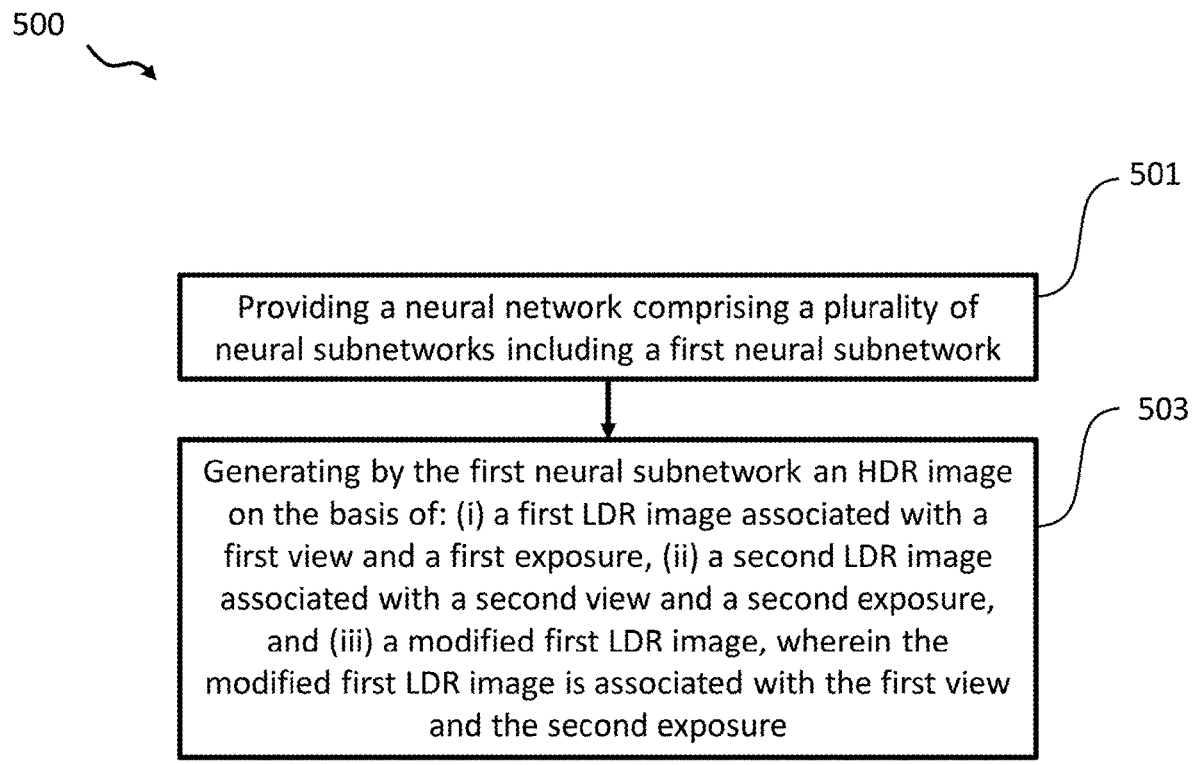
FIG. 5 shows a flow diagram illustrating an image processing method according to an embodiment.

FIG. 5 shows a flow diagram illustrating a corresponding image processing method 500, which can be performed by the image processing apparatus 300, for generating an HDR image. The image processing method 500 comprises the step 501 of providing a neural network, wherein the neural network comprises a plurality of neural subnetworks including the first neural subnetwork 303. The method 500 comprises the additional step 503 of generating by the first neural subnetwork 303 the HDR image on the basis of: (i) the first LDR image, (ii) the second LDR image, and (iii) the modified version of the first LDR image, wherein the modified first LDR image is associated with the first view and the second exposure.

Thus, embodiments provide novel approaches which allow including all available LDR images into the scope of the HDR merging step. This includes the original input reference and non-reference LDR images, as well as all estimated instances of the reference LDR image (for example having the exposure times of the non-reference image). Moreover, embodiments provide a novel HDR guided de-ghosting stage which is based on an input tensor composed of all available LDR images, wherein the ghost-HDR image is gained from the input LDR images and an initial estimate of the HDR image corresponding to the view of the reference LDR. The guided de-ghosting step enhances the quality of the final HDR in terms of noise freedom and dynamic range expansion. Embodiments are based on CNNs for the purpose of effectively processing several images during the HDR merging and guided de-ghosting stages. Accordingly, each stage can be represented through a CNN sub-network (Color Mapping, HDR rendering, and guided-deghosting). All sub-networks are connected to form an end-to end mapping between the input LDR images and the output HDR of the reference image. Embodiments allow simulating a larger stack of available LDR images by training the model using ground truth HDR images which were generated using 3 or more LDR images.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. An image processing apparatus for generating a high dynamic range (HDR) image on the basis of a plurality of low dynamic range (LDR) images, the LDR images including a first LDR image and a second LDR image, wherein the first LDR image is associated with a first view and a first exposure, and wherein the second LDR image is associated with a second view and a second exposure, the image processing apparatus comprising:

a processor configured to provide a neural network, wherein the neural network comprises a plurality of neural subnetworks including a first neural subnetwork, wherein the first neural subnetwork is configured to generate the HDR image based on (i) the first LDR image, (ii) the second LDR image, and (iii) a modified first LDR image, wherein the modified first LDR image is associated with the first view and the second exposure.

2. The image processing apparatus of claim 1, wherein the plurality of neural subnetworks comprises a second neural subnetwork which is configured to generate the modified first LDR image based on (i) the first LDR image and (ii) the second LDR image by mapping the first LDR image to the second exposure.

3. The image processing apparatus of claim 2, wherein the plurality of LDR images further comprises a third LDR image, wherein the third LDR image is associated with a third view and a third exposure, wherein the second neural subnetwork comprises a first portion and a second portion, wherein the first portion of the second neural subnetwork is configured to generate the modified first LDR image based on (i) the first LDR image and (ii) the second LDR image by mapping the first LDR image to the second exposure, wherein the second portion of the second neural subnetwork is configured to generate a further modified first LDR image, and wherein the further modified first LDR image is associated with the first view and the second exposure, based on (i) the first LDR image and (ii) the third LDR image by mapping the first LDR image to the third exposure.

4. The image processing apparatus of claim 1, wherein the plurality of neural subnetworks comprises a third neural subnetwork configured to provide an improved version of the HDR image by removing ghosting artefacts from the HDR image based on (i) the first LDR image, (ii) the second LDR image, (iii) the modified first LDR image, (iv) the HDR image, and (v) a de-ghosting guiding HDR image.

5. The image processing apparatus of claim 4, wherein the processor includes an exposure fusion engine configured to generate the de-ghosting guiding HDR image based on an exposure fusion scheme based on (i) the first LDR image and (ii) the second LDR image.

6. The image processing apparatus of claim 5, wherein the exposure fusion engine is configured to generate the de-ghosting guiding HDR image based on the exposure fusion scheme by performing a weighted blending of (i) the first LDR image and (ii) the second LDR image using a weight map based on one or more quality measures.

7. The image processing apparatus of claim 1, wherein each of the plurality of neural subnetworks comprises one or more convolutional layers and one or more de-convolutional layers.

8. The image processing apparatus of claim 1, wherein the neural network is configured to be trained with a plurality of training sets, wherein each training set comprises an HDR image and a plurality of LDR images and wherein at least some training sets comprise more than two LDR images.

9. The image processing apparatus of claim 1, wherein the first neural subnetwork comprises a weighting layer configured to generate a weighting map based on one or more quality measures for reducing effects of low quality regions of the first LDR image and the second LDR image in generating the HDR image.

10. The image processing apparatus of claim 1, wherein the processor is further configured to select the first LDR image from the plurality of LDR images as a reference image based on a quality measure for reference image selection.

11. The image processing apparatus of claim 1, wherein the image processing apparatus further comprises a camera configured to capture the first LDR image and the second LDR image.

12. The image processing apparatus of claim 1, wherein the image processing apparatus further comprises a display configured to display the HDR image.

13. The image processing apparatus of claim 1, wherein the image processing apparatus is a smartphone.

14. An image processing method for generating a high dynamic range (HDR) image from a plurality of low dynamic range (LDR) images, including a first LDR image and a second LDR image, wherein the first LDR image is associated with a first view and a first exposure, and wherein the second LDR image is associated with a second view and a second exposure, the image processing method comprising:

providing a neural network, the neural network comprising a plurality of neural subnetworks including a first neural subnetwork, and generating, by the first neural subnetwork, the HDR image based on (i) the first LDR image, (ii) the second LDR image, and (iii) a modified first LDR image, wherein the modified first LDR image is associated with the first view and the second exposure.

15. A non-transitory computer-readable medium comprising program code which, when executed by a processor, causes the processor to perform the method of claim 14.

* * * * *